United States Patent
Ly et al.

(10) Patent No.: US 10,244,461 B2
(45) Date of Patent: Mar. 26, 2019

(54) SCALABLE SYSTEM INFORMATION BLOCK (SIB) BITMAP STRUCTURE

(71) Applicant: QUALCOMM Incorporated, San Diego, CA (US)

(72) Inventors: Hung Ly, San Diego, CA (US); Keiichi Kubota, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/480,692

(22) Filed: Apr. 6, 2017

(65) Prior Publication Data
US 2017/0325157 A1    Nov. 9, 2017

Related U.S. Application Data

(60) Provisional application No. 62/333,662, filed on May 9, 2016.

(51) Int. Cl.
| | |
|---|---|
| *H04W 74/00* | (2009.01) |
| *H04W 48/14* | (2009.01) |
| *H04W 4/70* | (2018.01) |
| *H04W 88/02* | (2009.01) |
| *H04W 48/12* | (2009.01) |

(52) U.S. Cl.
CPC ............ *H04W 48/14* (2013.01); *H04W 4/70* (2018.02); *H04W 74/004* (2013.01); *H04W 48/12* (2013.01); *H04W 88/02* (2013.01)

(58) Field of Classification Search
None
See application file for complete search history.

(56) References Cited

U.S. PATENT DOCUMENTS

| 9,756,656 | B2 * | 9/2017 | You | H04L 1/1864 |
| 2017/0251500 | A1 * | 8/2017 | Agiwal | H04W 4/06 |

FOREIGN PATENT DOCUMENTS

WO    2014129951 A1    8/2014

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 13)", 3GPP TS 36.331, Apr. 1, 2016, XP051088537, pp. 1-551.
International Search Report and Written Opinion—PCT/US2017/026488—ISA/EPO—dated Jul. 10, 2017.

(Continued)

*Primary Examiner* — German Viana Di Prisco
(74) *Attorney, Agent, or Firm* — Patterson & Sheridan, L.L.P.

(57) ABSTRACT

Aspects of the present disclosure provide a scalable SIB bitmap structure. As described herein, a UE may generate and transmit, to an access network, a dual-layer system information block (SIB) request, wherein a first layer indicates a SIB category and a second layer indicates one or more groups within the SIB category. A base station in an access network may receive, from a UE, the dual-layer SIB request. The scalable, efficient bitmap structure may be shared by the UE and access network, thereby enabling SIB-on-Demand requests by the UE and responses to SIB-on-Demand requests by the access network.

30 Claims, 12 Drawing Sheets

(56) References Cited

OTHER PUBLICATIONS

NTT DOCOMO Inc: "On-Demand SI Provisioning Request", 3GPP TSG-RAN WG2 #97bis, R2-1703312, Mar. 25, 2017, XP051254451, Retrieved from the Internet: URL:www.3gpp.org/ftp/tsg_ran/WG2_RL2/TSGR2_97bis/Docs/, 3 pages.
Samsung: "Preliminary View on Initial Access in 5G," 3GPP TSG-RAN WG2 Meeting #93bis, R2-162300, Dubrovnik, Croatia, Apr. 4, 2016, XP051082676, Retrieved from the Internet: URL:http://www.3gpp.org/ftp/tsg_ran/WG2_RL2/TSGR2_93bis/Docs/, 3 pages.

\* cited by examiner

SCALABLE SYSTEM INFORMATION BLOCK (SIB) BITMAP STRUCTURE

CROSS-REFERENCE TO RELATED APPLICATIONS

This application claims benefit of priority from commonly-owned U.S. Provisional Application Ser. No. 62/333,662, filed on May 9, 2016, entitled "SCALABLE SYSTEM INFORMATION BLOCK (SIB) BITMAP STRUCTURE," which is expressly incorporated herein by reference in its entirety.

INTRODUCTION

The present disclosure generally relates to wireless communications and, more particularly, to the construction and use of a scalable and efficient dual-layer system information block (SIB) request transmitted from a UE to an access network.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

Future generations of wireless communication may focus on user-centric networks. Accordingly, it may be desirable to have an efficient method for a user to selectively request specific services from an access network and an access network to respond in accordance with the request.

SUMMARY

Certain aspects of the present disclosure provide a method for wireless communication by a user equipment (UE). The method generally includes generating a dual-layer system information block (SIB) request, wherein a first layer indicates a SIB category and a second layer indicates one or more groups within the SIB category, and transmitting the dual-layer SIB request to an access network.

Certain aspects of the present disclosure provide an apparatus for wireless communication by a user equipment (UE). The apparatus generally includes means for generating a dual-layer system information block (SIB) request, wherein a first layer indicates a SIB category and a second layer indicates one or more groups within the SIB category, and means for transmitting the dual-layer SIB request to an access network.

Certain aspects of the present disclosure provide an apparatus for wireless communication by a user equipment (UE). The apparatus generally includes at least one processor and a memory coupled with the at least one processor. The at least one processor is generally configured to generate a dual-layer system information block (SIB) request, wherein a first layer indicates a SIB category and a second layer indicates one or more groups within the SIB category and transmit the dual-layer SIB request to an access network Certain aspects of the present disclosure provide a computer readable medium storing computer executable code for causing a user equipment (UE) to generate a dual-layer system information block (SIB) request, wherein a first layer indicates a SIB category and a second layer indicates one or more groups within the SIB category, and transmit the dual-layer SIB request to an access network.

Certain aspects of the present disclosure provide a method for wireless communication by a base station. The method generally includes receiving, from a user equipment (UE), a dual-layer system information block (SIB) request, wherein a first layer indicates a SIB category and a second layer indicates one or more groups within the SIB category, and in response to the request, transmitting, to the UE, one or more requested SIBs.

Certain aspects of the present disclosure provide an apparatus for wireless communication by a base station. The apparatus generally includes means for receiving, from a user equipment (UE), a dual-layer system information block (SIB) request, wherein a first layer indicates a SIB category and a second layer indicates one or more groups within the SIB category and in response to the request, means for transmitting, to the UE, one or more requested SIBs.

Certain aspects of the present disclosure provide an apparatus for wireless communication by a base station. The apparatus generally includes at least one processor and a memory coupled with the at least one processor. The at least one processor is generally configured to receive, from a user equipment (UE), a dual-layer system information block (SIB) request, wherein a first layer indicates a SIB category and a second layer indicates one or more groups within the SIB category; and in response to the request, transmit, to the UE, one or more requested SIBs.

Certain aspects of the present disclosure provide a computer readable medium storing computer executable code for causing a base station to receive, from a user equipment (UE), a dual-layer system information block (SIB) request, wherein a first layer indicates a SIB category and a second layer indicates one or more groups within the SIB category, and in response to the request, transmit, to the UE, one or more requested SIBs.

Aspects generally include methods, apparatus, systems, computer program products, and processing systems, as substantially described herein with reference to and as illustrated by the accompanying drawings.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
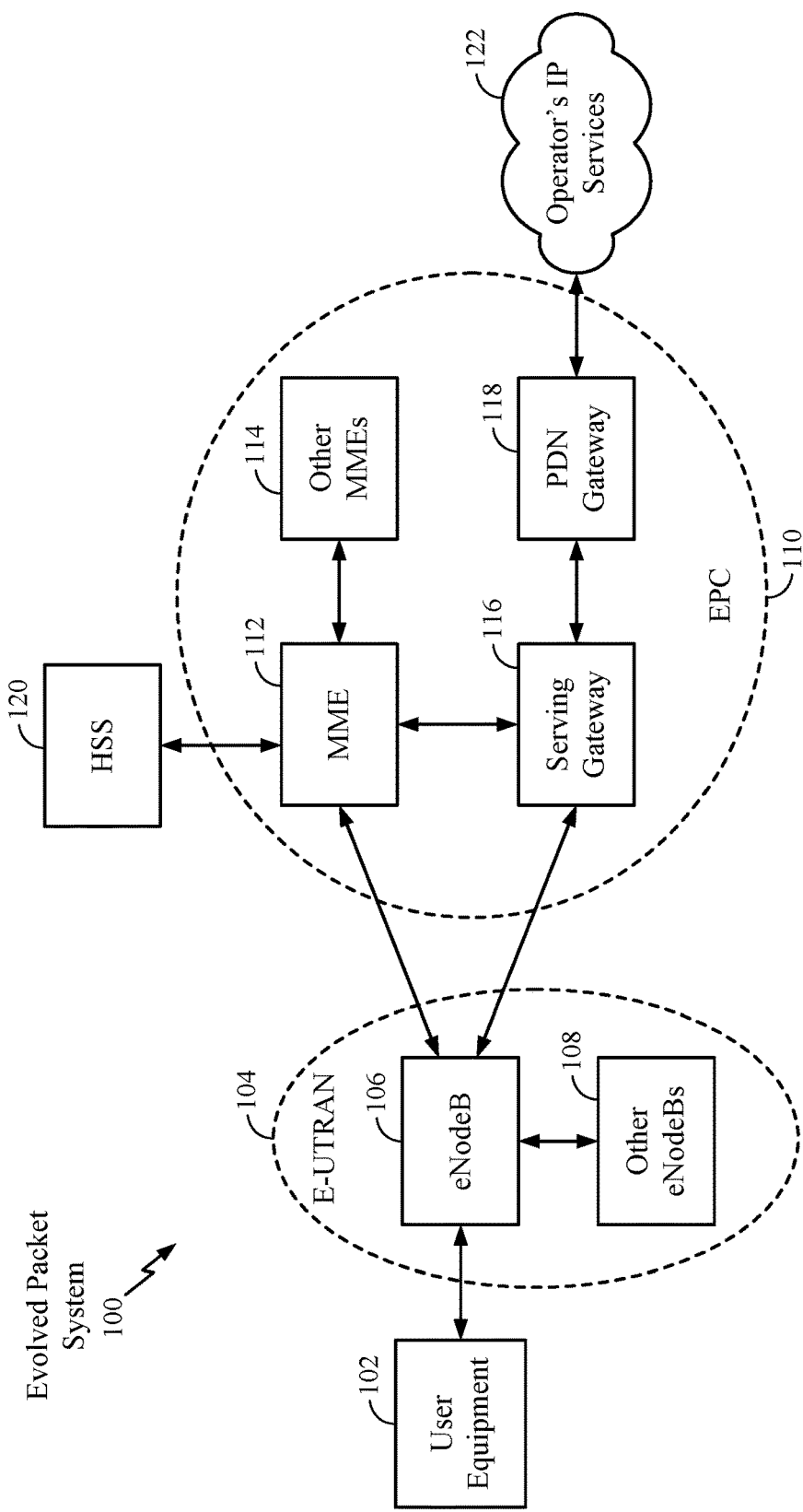
FIG. 1 is a diagram illustrating an example of a network architecture.

Aspects of the present disclosure provide techniques and apparatus for constructing and using a scalable and efficient SIB bitmap structure for SIB-on-Demand requests transmitted by a UE to an access network (AN). As described herein, the SIB request bitmap may indicate the selected SIBs that the UE would like to acquire. An AN (e.g., a BS) may receive the request, and may use the bitmap structure to understand the SIBs the UE has requested. In this manner, a UE may efficiently transmit a request for desired SIBs and, in response, the AN may transmit the desired SIBs to the UE. As will be described in more detail herein, the bitmap structure may be efficient and scalable. In other words, the SIB bitmap may carry a small number of bits and may have a fixed length, regardless of the number of SIBs.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software/firmware, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software/firmware, or combinations thereof. If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

The techniques described herein may be used for various wireless communication networks such as code division multiple access (CDMA), time division multiple access (TDMA), frequency division multiple access (FDMA), orthogonal FDMA (OFDMA), single carrier FDMA (SC-FDMA) and other networks. The terms "network" and "system" are often used interchangeably. A CDMA network may implement a radio access technology (RAT) such as universal terrestrial radio access (UTRA), cdma2000, etc. UTRA includes wideband CDMA (WCDMA) and other variants of CDMA. cdma2000 covers IS-2000, IS-95 and IS-856 standards. IS-2000 is also referred to as 1× radio transmission technology (1×RTT), CDMA2000 1×, etc. A TDMA network may implement a RAT such as global system for mobile communications (GSM), enhanced data rates for GSM evolution (EDGE), or GSM/EDGE radio access network (GERAN). An OFDMA network may implement a RAT such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP long-term evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and RATs mentioned above as well as other wireless networks and RATs.

It is noted that while aspects may be described herein using terminology commonly associated with 3G and/or 4G wireless technologies, aspects of the present disclosure can be applied in other generation-based communication systems, such as 5G and later.

FIG. 1 illustrates an example deployment in which aspects of the present disclosure may be implemented.

A UE 102 and access network 104 (including eNodeB 106) may use a common bitmap structure. For example, the UE may use the SIB bitmap structure to look up the SIB bitmap corresponding to the selected SIBs and the AN may use the bitmap to understand the SIBs that the UE has requested. As described herein, the SIB request may be a dual-layer request. The first layer may indicate a SIB category and a second layer may indicate one or more groups within the SIB category.

The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. Exemplary other access networks may include an IP Multimedia Subsystem (IMS) PDN, Internet PDN, Administrative PDN (e.g., Provisioning PDN), carrier-specific PDN, operator-specific PDN, and/or GPS PDN. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), an access point, or some other suitable terminology. The eNB 106 may provide an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, an ultrabook, a drone, a robot, a sensor, a monitor, a meter, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, etc. MTC UEs, as well as other types of UEs, may be implemented as NB-IoT (narrowband internet of things) devices.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include, for example, the Internet, the Intranet, an IP Multimedia Subsystem (IMS), and a PS (packet-switched) Streaming Service (PSS). In this manner, the UE 102 may be coupled to the PDN through the LTE network.

Figure 2:
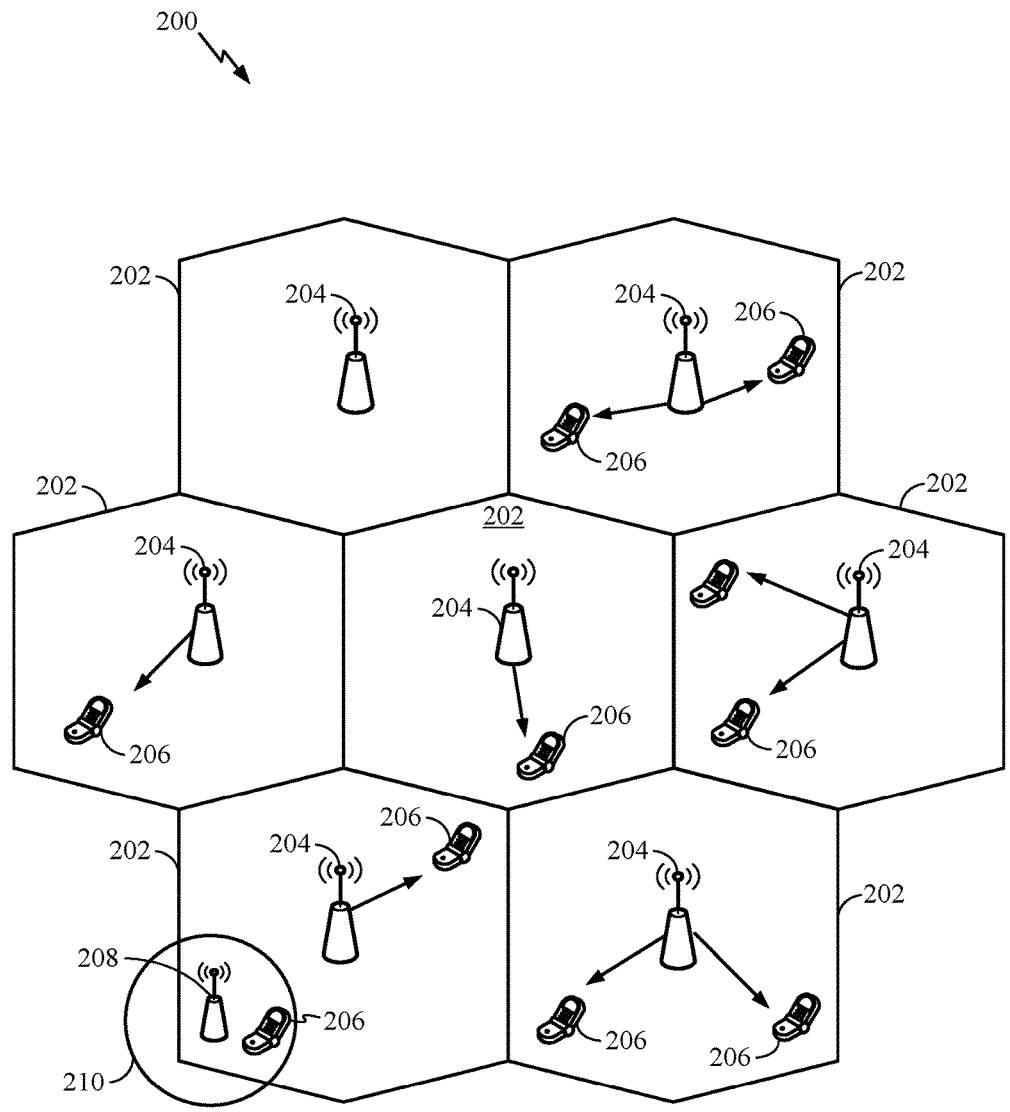
FIG. 2 is a diagram illustrating an example of an access network, in accordance with certain aspects of the disclosure.

FIG. 2 is a diagram illustrating an example of an access network 200 in an LTE network architecture. While and LTE architecture is illustrated, the access network 200 may be any type of network, including a 5G network.

The UE 206 may generate a dual-layer system information block (SIB) request, wherein a first layer indicates a SIB category and a second layer indicates one or more groups within the SIB category and may transmit the dual-layer request to an access network. Correspondingly, the access network 200 may receive a dual-layer SIB request, wherein a first layer indicates a SIB category and a second layer indicates one or more groups within the SIB category and in response, may transmit one or more requested SIBs to the UE.

In FIG. 2, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
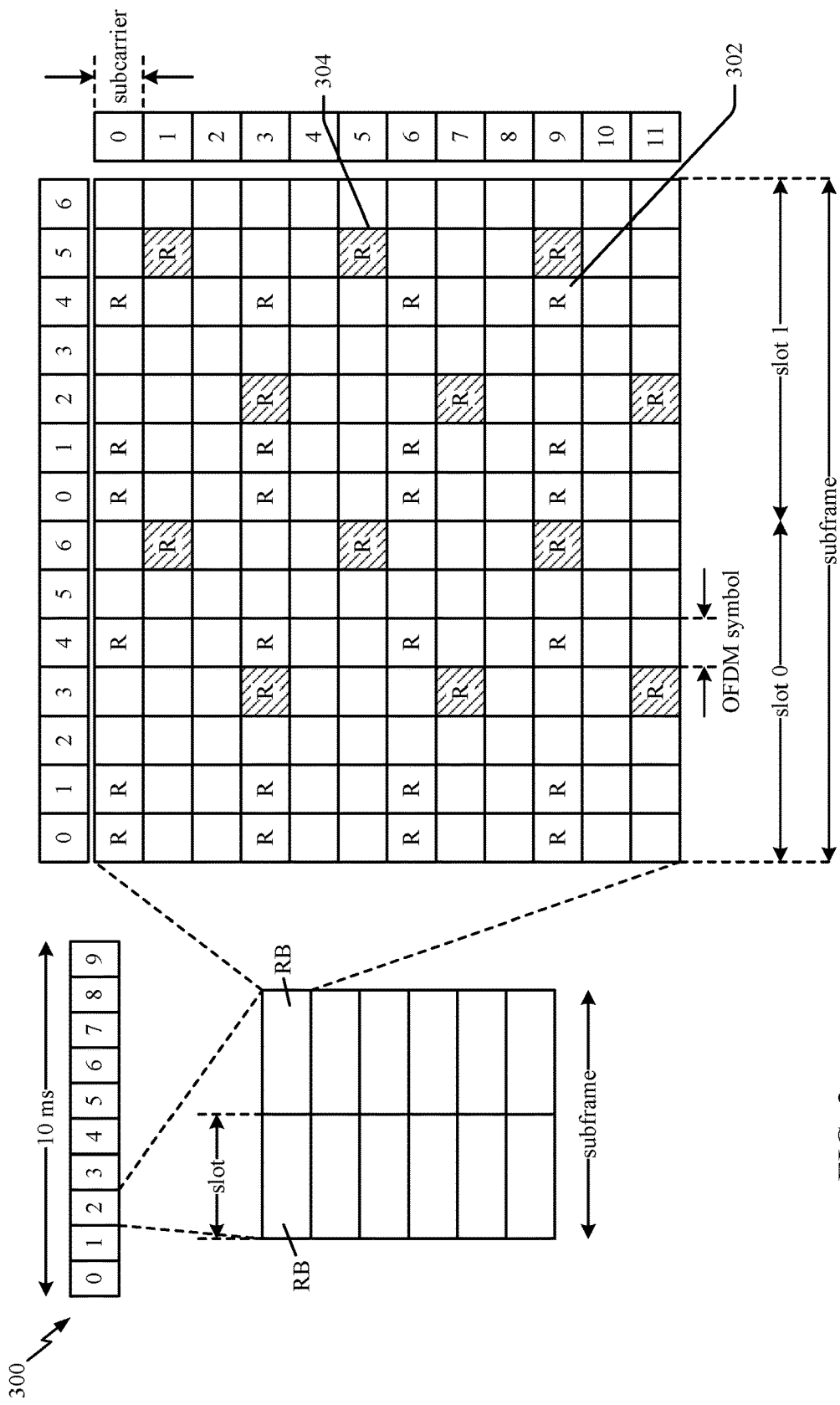
FIG. 3 is a diagram illustrating an example of a DL frame structure in LTE, in accordance with certain aspects of the disclosure.

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
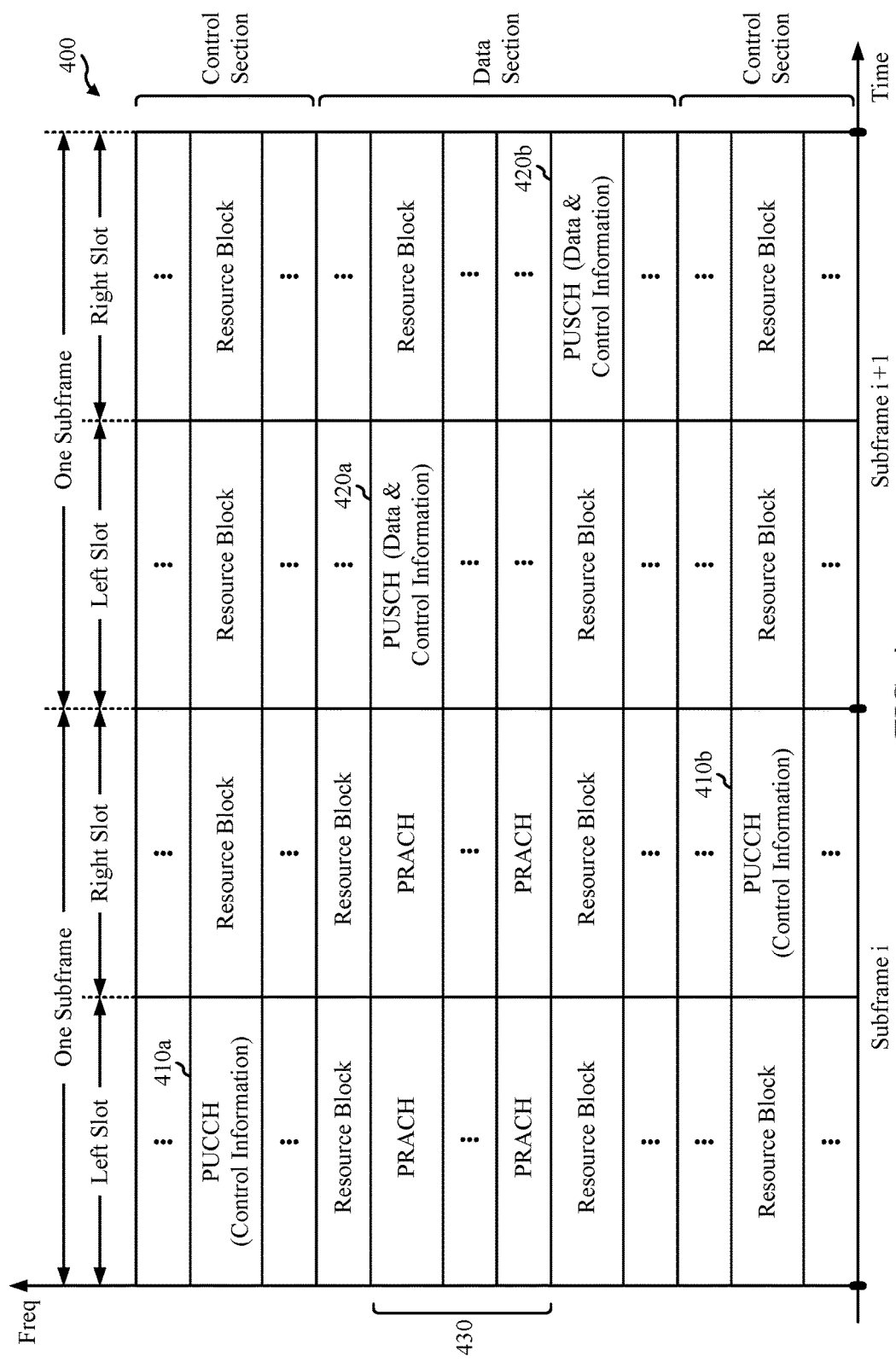
FIG. 4 is a diagram illustrating an example of an UL frame structure in LTE, in accordance with certain aspects of the disclosure.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
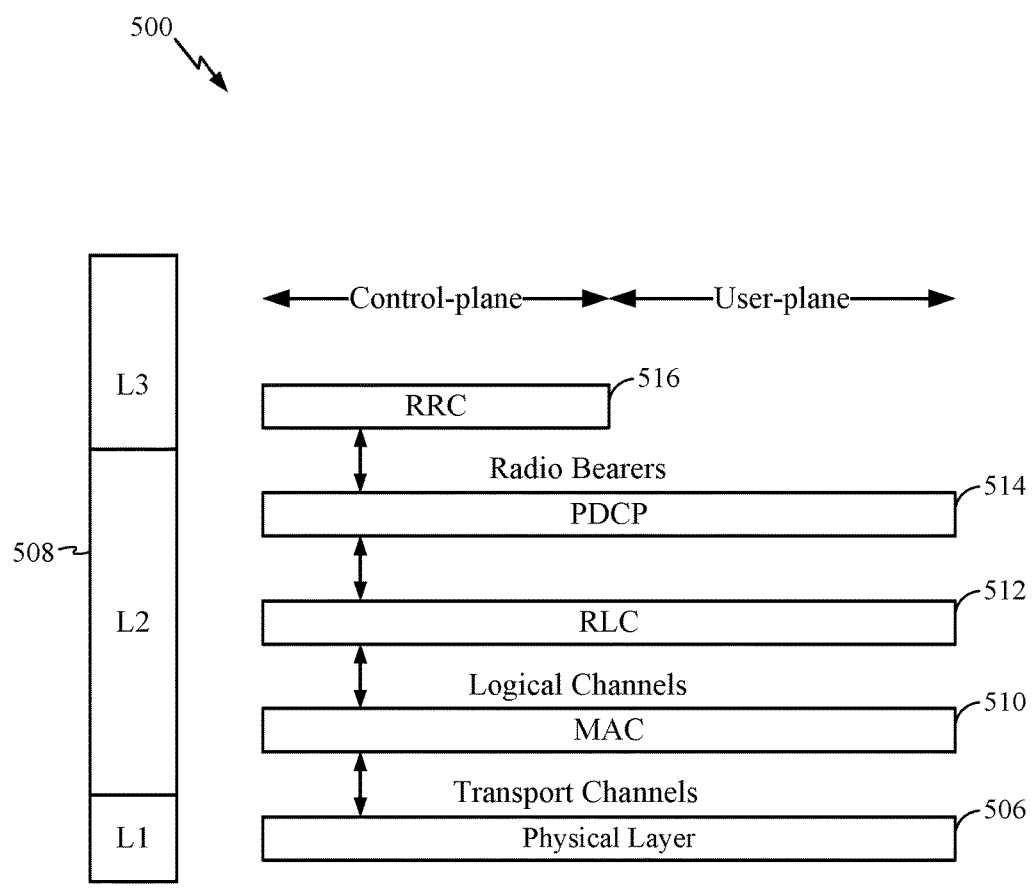
FIG. 5 is a diagram illustrating an example of a radio protocol architecture for the user and control plane, in accordance with certain aspects of the disclosure.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
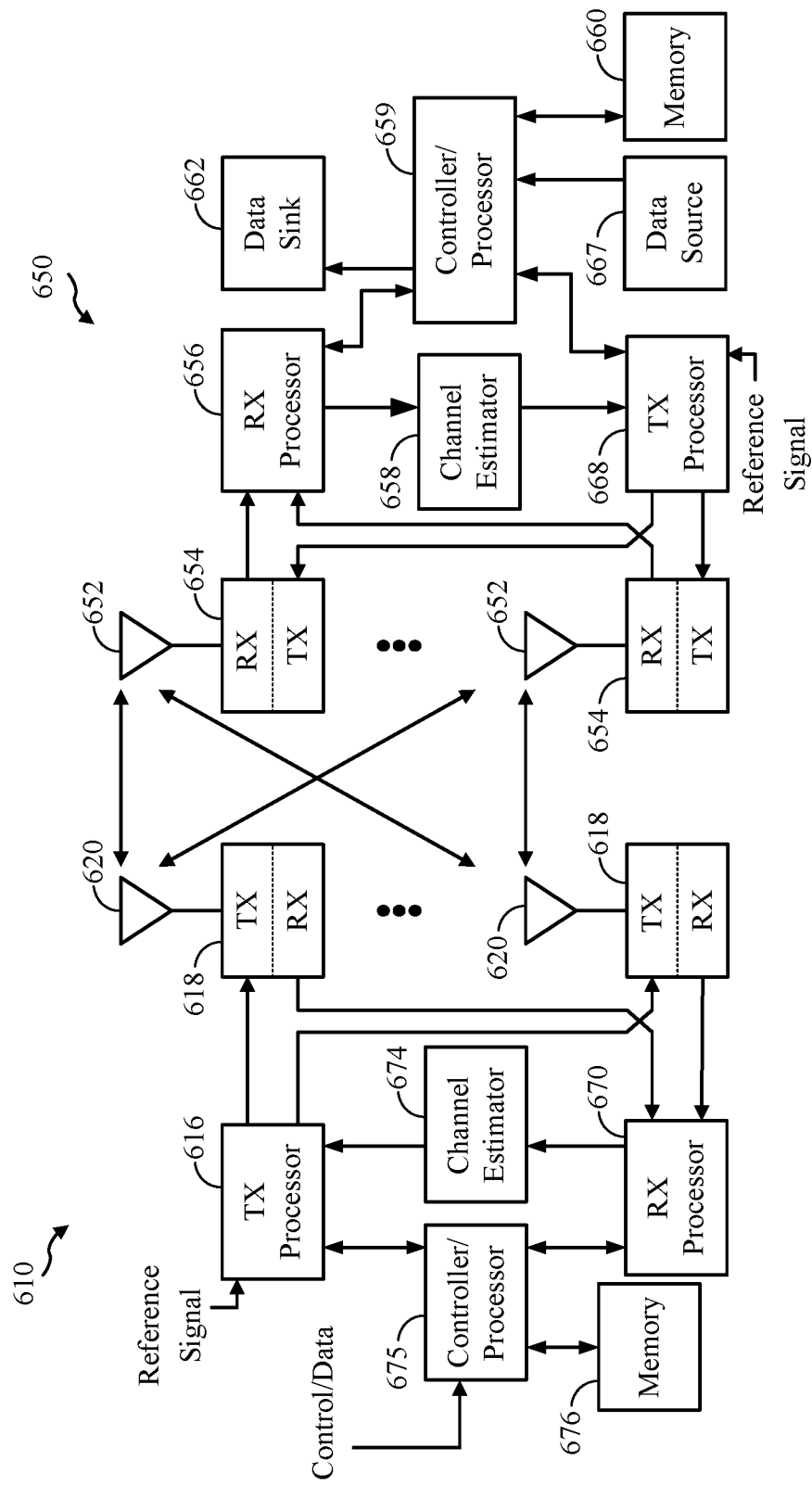
FIG. 6 is a diagram illustrating an example of an evolved Node B (eNB) and user equipment (UE) in an access network, in accordance with certain aspects of the disclosure.

FIG. 6 is a block diagram of an eNB 610 in communication with a UE 650 in an access network in accordance with aspects of the present disclosure. The eNBs of FIG. 1 and FIG. 2 may include one or more components of eNB 610 illustrated in FIG. 6. Similarly, the UEs illustrated in FIG. 1 and FIG. 2 may include one or more components of UE 650 as illustrated in FIG. 6. One or more components of the UE 650 and eNB 610 may be configured to perform the operations described herein.

In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor 659 can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 13:
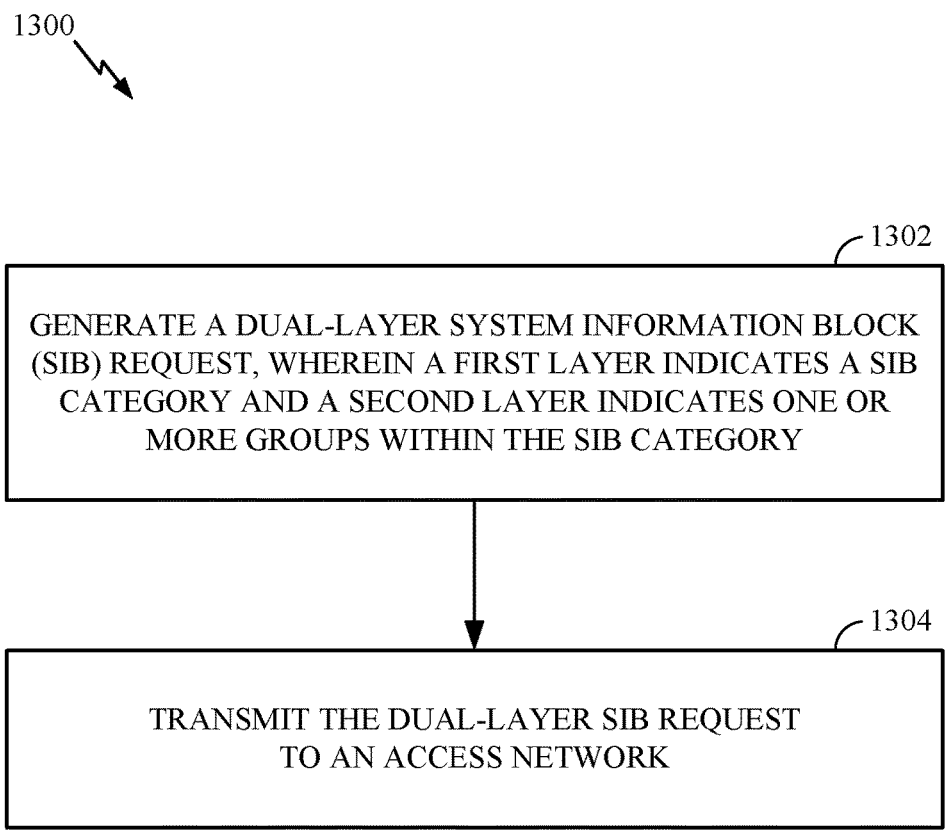
FIG. 13 illustrates example operations, performed by a UE, in accordance with certain aspects of the disclosure.
Figure 14:
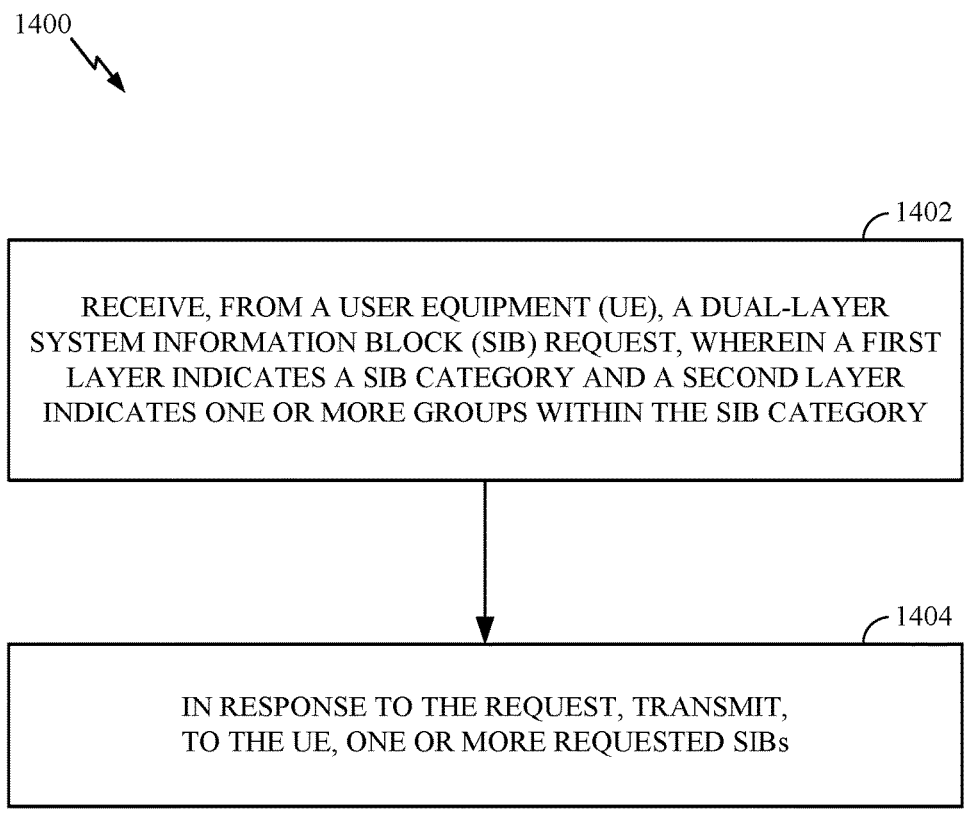
FIG. 14 illustrates example operations, performed by base station, in accordance with certain aspects of the disclosure.

The controller/processor 659 may direct the operation at the UE 650. The controller/processor 659 and/or other processors, components, and/or modules at the UE 650 may perform or direct operations performed by the UE as described herein. The controller/processor 675 may direct the operations at the eNB 610. The controller/processor 675 and/or other processors, components, and/or modules at the eNB 610 may perform or direct operations performed by the eNB as described herein. In aspects, one or more of any of the components shown in FIG. 6 may be employed to perform example operations, 1300 and 1400 as shown in FIGS. 13 and 14 other UE and BS operations for the techniques illustrated and described herein.

As an example, one or more of the antenna 620, transceiver 618, controller/processor 675, and memory 676 may be configured to receive, from a UE, a dual-layer SIB request, wherein a first layer indicates a SIB category and a second layer indicates one or more groups within the SIB category and in response to the request, transmit, to the UE, one or more requested SIBs. One or more of the antenna 652, transceiver 654, controller/processor 659, and memory 660 may be configured to generate a dual-layer SIB request, wherein a first layer indicates a SIB category and a second layer indicates one or more groups within the SIB category and transmitting the dual-layer request to an access network.

Scalable SIB Bitmap Structure

Figure 7:
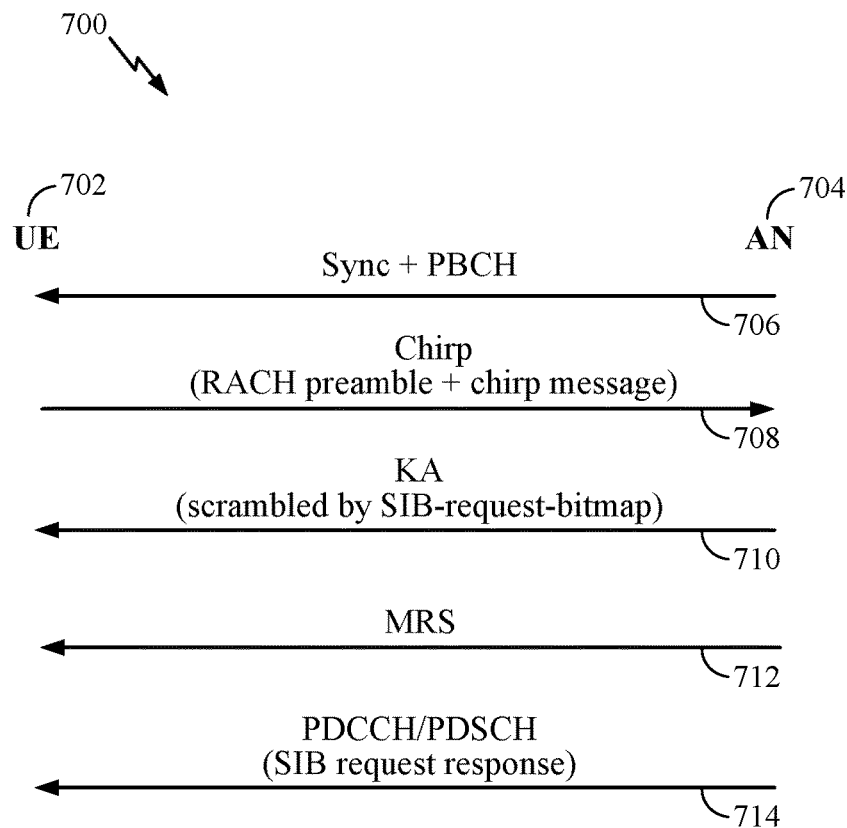
FIG. 7 illustrates an example communication between a UE and an access network.

FIG. 7 illustrates an example call-flow diagram 700 illustrating transmissions that may occur between a UE 702 and an access network (AN) 704 (e.g., a base station).

At 706, the UE may wake-up according to its discontinuous reception (DRX) cycle, synchronize with the network, and receive a physical broadcast channel (PBCH). The PBCH is designed to be detectable by the UE without prior knowledge of system bandwidth and to be accessible at the cell edge. The PBCH may broadcast parameters in a Master Information Block (MIB) that the UE may use in an effort to decode other physical channels. For example, the PBCH may broadcast parameters for initial access of a cell such as downlink system bandwidth, the Physical Hybrid ARQ Indicator Channel structure, and the most significant eight-bits of the System Frame Number (SFN).

At 708, the UE may transmit an uplink chirp signal. The uplink chirp signal may provide the AN with the UE's identification. In a user equipment centric mobility (UECM) system, such as a 5G wireless system, the uplink chirp signal may be used as a type of request by the UE to the AN. The chirp message may be used for a random access request, a mobility check-in (e.g., in an effort for the AN to better track the position of the UE), and/or a SIB-on-Demand request from the UE.

Many groups of services may exists in certain wireless systems, such as 5G. Non-limiting example groups of services may include enhanced mobile broadband (eMBB), mission critical, massive Machine Type Communications (mMTC) services, or Internet of Everything (IoE) services. Groups of services may include many SIBs and the UE may desire a subset of available SIBs.

Accordingly, at 708, the UE may transmit a RACH preamble and a chirp message (a part of the chirp signal). An example chirp message for a SIB-on-Demand request is illustrated in FIG. 8.

At 710, the AN may transmit a keep alive (KA) message. The KA message may be scrambled by the SIB-request bitmap. At 712, the AN may transmit a measurement reference signal (MRS). At 714, the AN may transmit a PDCCH and/or PDSCH which may include the SIB request response.

In certain wireless systems, such as LTE, an eNB may periodically broadcast SIBs. As the number of SIBs increases and in an effort to allow a UE to efficiently request specific SIBs, aspects of the present disclosure provide a scalable and efficient SIB bitmap structure that may be used, understood, and shared by the UE and at the AN (e.g., BS).

Figure 8:
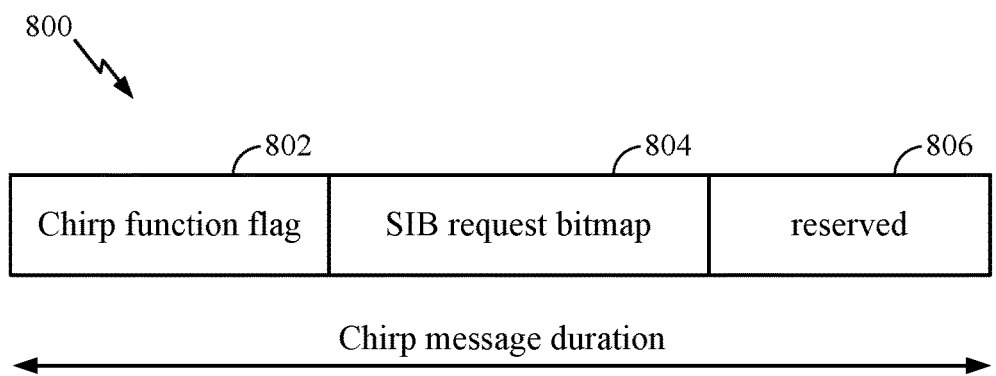
FIG. 8 illustrates an example bitmap structure, in accordance with certain aspects of the present disclosure.

FIG. 8 illustrates an example chirp message 800, according to aspects of the present disclosure. The chirp message may include a chirp function flag 802, a SIB request bitmap 804, and reserved bits 806. The illustrated SIB request bitmap may be used by a UE to specifically request one or more SIBs from the network. Correspondingly, the SIB structure may be used by the AN to understand the SIBs the UE has requested. According to aspects, the reserved bits may indicate a UE ID.

Figure 9:
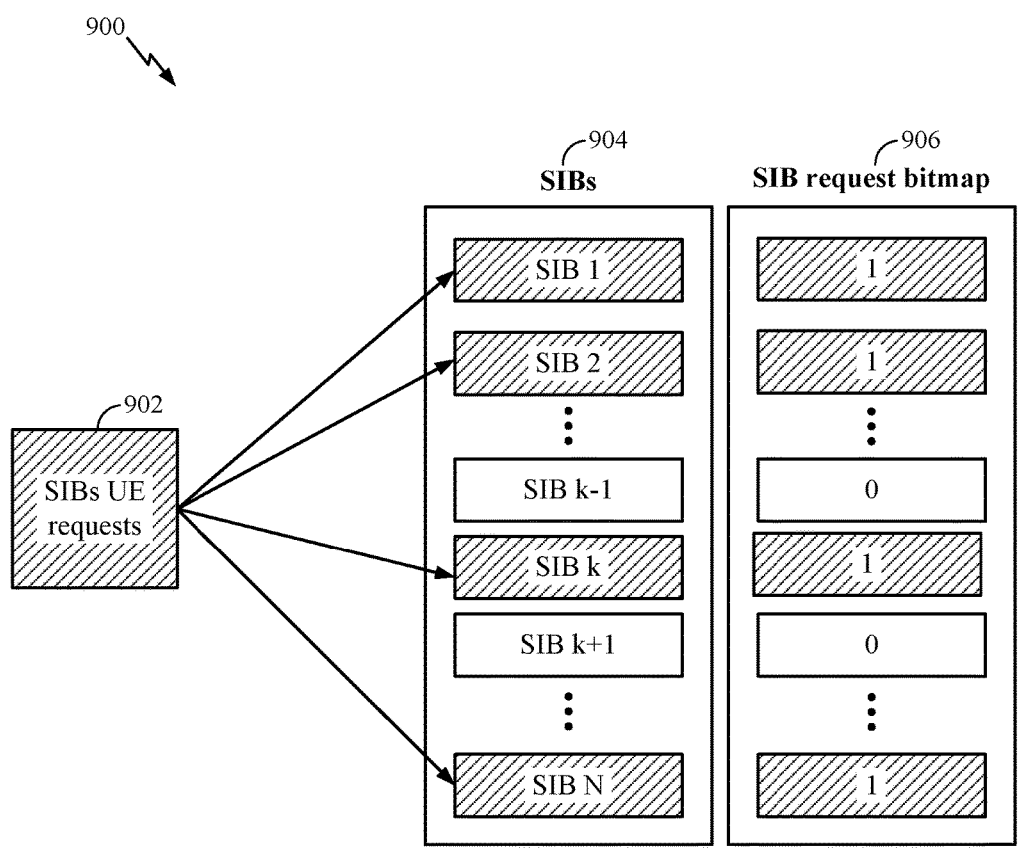
FIG. 9 illustrates an example dual-layer bitmap structure.

FIG. 9 illustrates an example non-scalable bitmap structure 900. A UE may request a subset of available SIBs. According to an example, a SIB request 902 transmitted by the UE may request one or more SIBs. As shown at 904, a UE may request SIB 1, SIB 2, SIB k, and SIB N. The UE may request the desired SIBs via a bitmap 906, wherein a flag is set to "1" to indicate a request for the corresponding SIB. Otherwise, the flag is set to "0". Accordingly, the bitmap structure 900 requires N bits to construct a complete SIB bitmap. For example, if N=3, the complete bitmap structure={001, 010, 011, 100, 101, 110, 111}. The illustrated structure provides fine SIB filtering; however, it may be challenging to make this structure scalable and efficient.

In other words, in the structure illustrated in FIG. 9, the number of bits N grows linearly with the number of SIBs. Additional bits may be reserved in a SIB request bitmap for future introduction of new SIBs; however, it may be wasteful for reserved bits to remain unused in a chirp signal. Additionally, the allocated bits for a SIB request in the chirp message may be limited due to the fixed size of the chirp message.

For these reasons, it may be desirable to have a scalable SIB bitmap structure, which is shared by both UE and network. More specifically, the UE may use the SIB bitmap structure to look up the SIB bitmap corresponding to selected SIBs while the network may use the structure to understand the SIBs that UE has requested.

Figure 10:
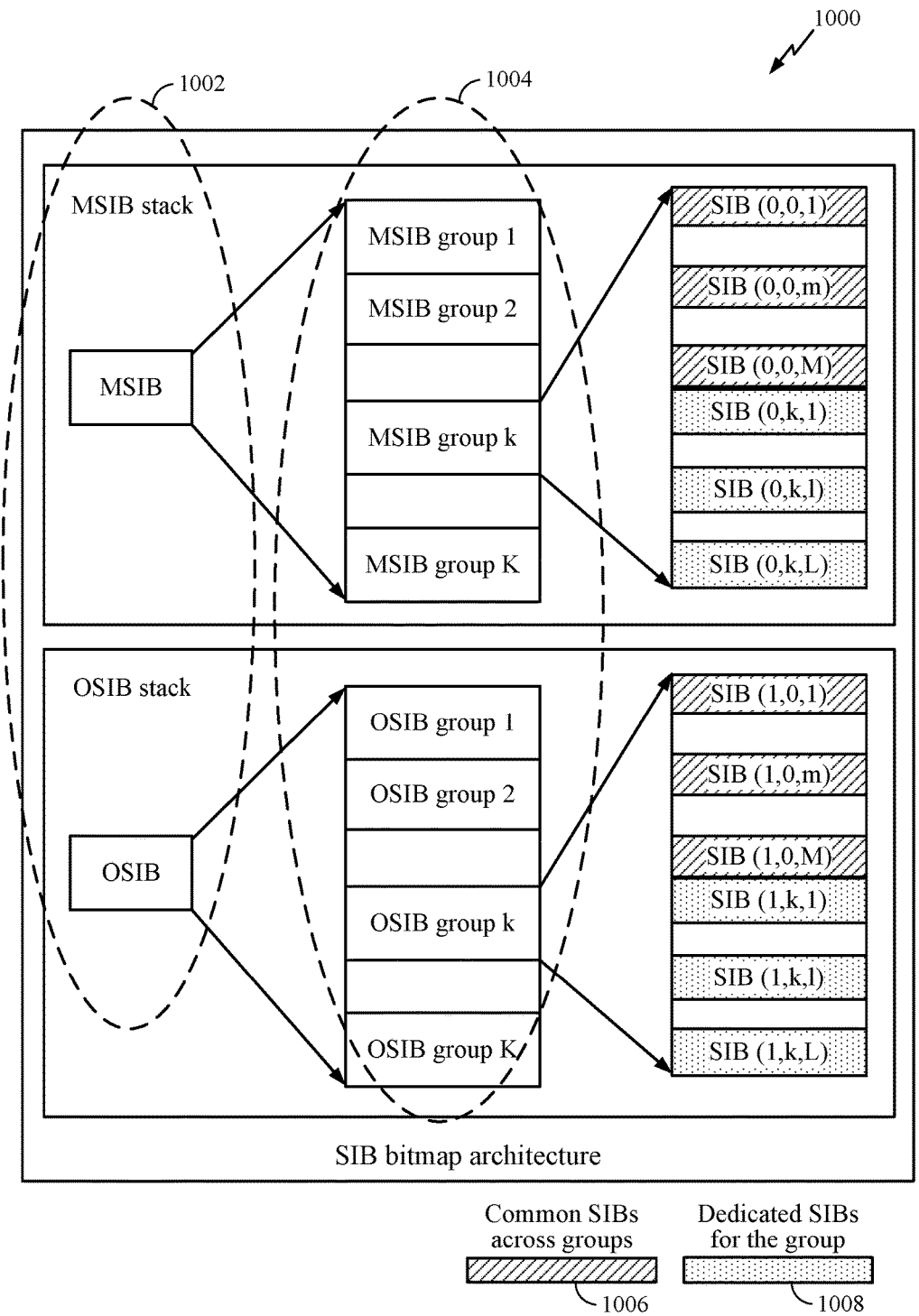
FIG. 10 illustrates an example SIB bitmap format, in accordance with certain aspects of the present disclosure.

FIG. 10 illustrates an example dual-layer bitmap structure 1000, in accordance with aspects of the present disclosure. As will be described in more detail herein, the SIB request bitmap may be a dual-layer SIB request, wherein a first layer indicates a SIB category and a second layer indicates one or more groups within the SIB category. The SIB bitmap may be advantageously constructed using multi-layer coding. The resulting structure may be both efficient and scalable.

The SIB structure may efficiently include a small number of bits, thereby having less bits transmitted in the chirp message for SIB request bitmap. The SIB bitmap may be scalable by having a fixed length regardless of the number of SIBs. The scalability of the bitmap structure may be particularly important as more SIBs are introduced.

SIBs may be partitioned into two categories: Master SIBs (MSIBs) and Other SIBs (OSIBs). MSIBs may include information necessary for the UE to access a network and OSIBs may include other information, such as intra-RAT neighbors, inter-RAT neighbors, multimedia broadcast and multicast service (MBMS) information, and/or positioning related information. Contents of the MSIB may be different per UE type. For example, a MTC device may only need a subset of a non-MTC device's MSIB. According to aspects, the access network may provide different MSIBs depending on the devices (e.g., UE's) capabilities. A UE may request MSIB more often than OSIBs.

As described above, certain wireless systems, including 5G, may support multiple services (e.g., groups as shown in FIG. 10) including, for example, eMBB, mMTC, mission critical, IoE. Some SIBs may be common for all services (e.g., groups as shown in FIG. 10) while others are specific to a particular service (e.g., group) within the SIB category.

The SIB bitmap structure 1000 is a dual-layer SIB request. The SIB bitmap provides the address to a group of the SIBs. The first layer 1002 indicates a SIB category. The SIB category may include MSIB or OSIB. This layer (Layer 1 1002) may require 1 bit in the SIB bitmap (or address). The UE may request MSIB, OSIB, or both MSIB and OSIB. Examples of requesting one of MSIB or OSIB, or requesting both MSIB and OSIB are described in more detail below with reference to FIGS. 11 and 12.

The second layer 1004 indicates the SIB group (e.g., service) within the SIB category. As described above, the SIB group may indicate one or more of eMBB, mMTC, mission critical, and/or IoE services. This layer (Layer 2 1004) may require T=log 2(K) bits in the SIB bitmap, where K indicates a number of services.

Each SIB group of in the second layer 1004 may include a set of SIBs 1006 which are common to all SIB groups within the SIB category. For example, as illustrated in FIG. 10, SIB (0, 0, 1), SIB (0, 0, m), and SIB (0, 0, M) may be common to all SIB groups within the MSIB category 1002. Similarly, SIB (1, 0, 1), SIB (1, 0, m), and SIB (1, 0, M) may be common to all SIB groups within the OSIB category 1002.

Each SIB group in the second layer 1004 may include a set of SIBs 1008 which are dedicated to the respective SIB group within the SIB category. For example, as illustrated in FIG. 10, SIB (0, k, 1), SIB (0, k, 1), and SIB (0, k, L) may be dedicated to group k within the MSIB category. Similarly, SIB (1, k, 1), SIB (1, k, 1), and SIB (1, k, L) may be dedicated to group K within the OSIB category.

Figure 11:
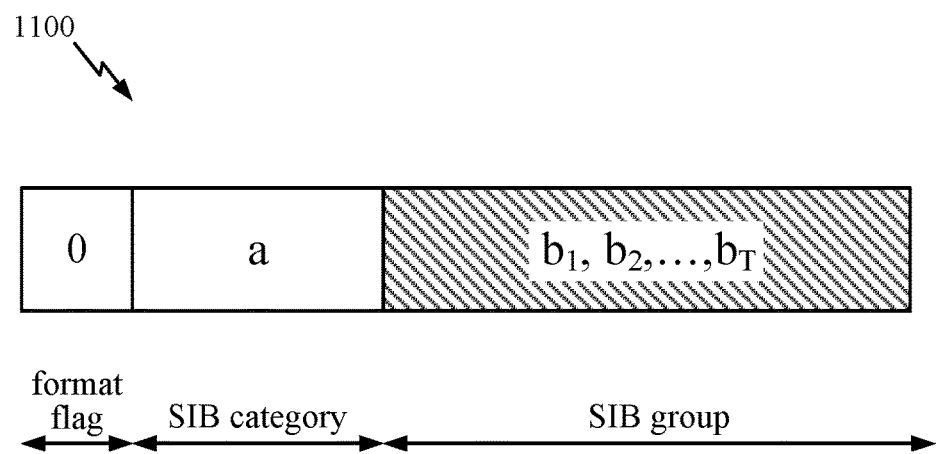
FIG. 11 illustrates an example SIB bitmap format, in accordance with certain aspects of the present disclosure.

FIG. 11 illustrates an example SIB bitmap format 1100, in accordance with aspects of the present disclosure. The SIB bitmap may be K bits long, where K=1+T. The first bit may be used to indicate the SIB category (e.g., one of MSIS or OSIB) and the remaining bits may be used for the requested SIB groups within the SIB category. Format 1100 may be suitable for requesting only one SIB category at a time.

Figure 12:
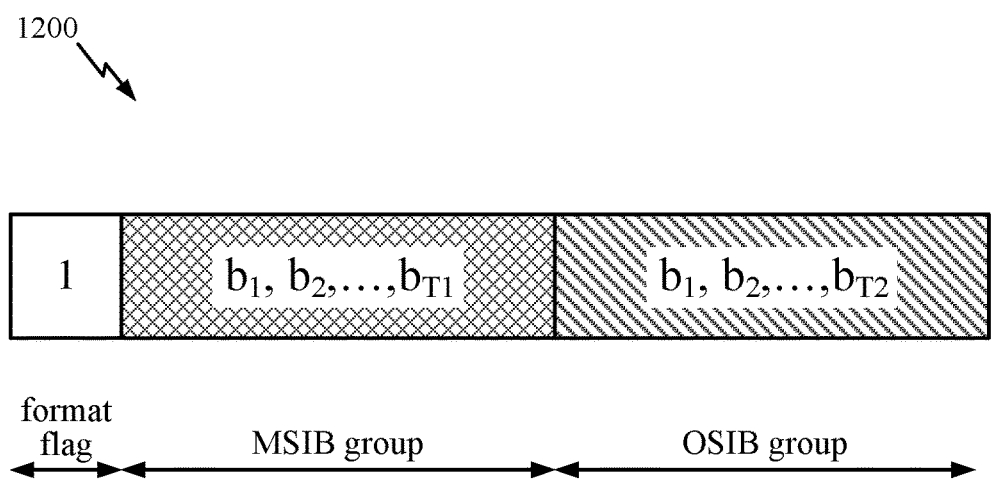
FIG. 12 illustrates an example SIB bitmap format, in accordance with certain aspects of the present disclosure.

FIG. 12 illustrates an example SIB bitmap format 1200, in accordance with aspects of the present disclosure. The K bits of the SIB request may be partitioned into two parts, as shown in FIG. 12. One part may represent the MSIB category and another part may represent the OSIB category. Format 1200 may be suitable for requesting SIBs in both MSIB and OSIB simultaneously.

Advantageously, new SIBs may be mapped into the appropriate SIB groups. In other words, SIBs specific to one group may be added to that group. For example, a new SIB, specific to eMBB service may be added to the eMBB SIB group.

FIG. 13 illustrates example operations 1300 which may be performed by a UE, in accordance with aspects of the present disclosure. The operations 1300 may be performed by one or more modules of UE 650. At 1302, the UE may generate a dual-layer system information block (SIB) request, wherein a first layer indicates a SIB category and a second layer indicates one or more groups within the SIB category. At 1304, the UE may transmit the dual-layer SIB request to an access network.

FIG. 14 illustrates example operations 1400 which may be performed by a base station of an access network. The operations 1400 may be performed by one or more modules of BS 610. At 1404, the BS may receive, from a user equipment (UE), a dual-layer system information block (SIB) request, wherein a first layer indicates a SIB category and a second layer indicates one or more groups within the SIB category. At 1404, the BS may, in response to the request, transmit, to the UE, one or more requested SIBs.

As described herein, the one or more groups in a SIB category may include a first subgroup, wherein the first subgroup comprises a set of SIBs common to all groups within the SIB category. Additionally, the one or more groups may also include a second subgroup, wherein the second subgroup comprises a set of SIBs dedicated to a respective group of the SIB category.

As described, for example, with respects to FIGS. 10 and 12, the dual-layer request may include a request for a first SIB category and a second SIB category (e.g., MSIB and OSIB, respectively). According to aspects, the UE may request MSIB more often than OSIBs. A MSIB may include information necessary for the UE to access a network and OSIBs may include other information, as described above. Contents of the MSIB may be different per UE type. In other words, according to aspects, the SIB category for one type of UE may be different than the same SIB category for another type of UE. For example, an MTC device may have a different MSIB as compared to the MSIB of a non-MTC device. As described above, a UE may request a MSIB, OSIB, or both MSIB and OSIBs. UEs may request a MSIB more often than OSIBs.

The one or more groups within the SIB categories may include at least one of: eMBB, mission critical, mMTC services, or IoE services.

As illustrated in FIG. 11, the dual-layer SIB request may include a format flag which indicates the request is for one SIB category. Accordingly, the dual-layer SIB request may include a one-bit category field which indicates the SIB category. The SIB request may also include a bitmap which indicates the one or more groups within the SIB category.

As illustrated in FIG. 12, the dual-layer SIB request may include a format flag which indicates the request is for more than one SIB category. One portion of the SIB request may indicate the one or more groups within a first SIB category (e.g., MSIB) and another portion of the SIB request may indicate the one or more groups within a second SIB category (e.g., OSIB).

As described herein, the SIB request bitmap in the chirp message may indicate the selected SIBs that UE wants to acquire. To support the SIB-on-Demand request/response procedure, a SIB bitmap structure, shared by both the UE and an access network, may be used. More specifically, the UE may use the SIB bitmap structure to look up the SIB bitmap corresponding to its selected SIBs while the network may use the structure to understand the SIBs that UE has requested.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A method for wireless communication by a user equipment (UE), comprising:
   generating a scalable dual-layer system information block (SIB) request, wherein a first layer indicates a SIB category including a subset of SIBs and a second layer indicates one or more groups within the SIB category; and
   transmitting the dual-layer SIB request to an access network.

2. The method of claim 1,
   wherein the one or more groups in a SIB category comprise a first subgroup,
   wherein the first subgroup comprises a set of SIBs common to all groups within the SIB category.

3. The method of claim 2,
   wherein the one or more groups further comprise a second subgroup,
   wherein the second subgroup comprises a set of SIBs dedicated to a respective group of the SIB category.

4. The method of claim 1, wherein the dual-layer SIB request comprises a request for a first SIB category and a second SIB category.

5. The method of claim 4, wherein the first SIB category comprises SIBs the UE uses more frequently than the second SIB category.

6. The method of claim 1, wherein the one or more groups comprise at least one of: enhanced mobile broadband (eMBB), mission critical, massive Machine Type Communications (mMTC) services, or Internet of Everything (IoE) services.

7. The method of claim 1, wherein the dual-layer SIB request comprises a format flag which indicates the request is for one SIB category.

8. The method of claim 7, wherein the dual-layer SIB request further comprises a one-bit category field which indicates the SIB category.

9. The method of claim 8, wherein the dual-layer SIB request further comprises a bitmap which indicates the one or more groups within the SIB category.

10. The method of claim 1, wherein the dual-layer SIB request comprises a format flag which indicates the request is for more than one SIB category.

11. The method of claim 10, wherein one portion of the SIB request indicates the one or more groups within a first SIB category and another portion of the SIB request indicates the one or more groups within a second SIB category.

12. The method of claim 1, wherein the SIB category for a first type of UE is different than the SIB category for a second type of UE.

13. A method for wireless communication by a base station, comprising:
   receiving, from a user equipment (UE), a scalable dual-layer system information block (SIB) request, wherein a first layer indicates a SIB category including a subset of SIBs and a second layer indicates one or more groups within the SIB category; and
   in response to the request, transmitting, to the UE, one or more requested SIBs.

14. The method of claim 13,
   wherein the one or more groups comprise a first subgroup, wherein the first subgroup comprises a set of SIBs common to all groups within the SIB category.

15. The method of claim 14,
wherein the one or more groups further comprise a second subgroup,
wherein the second subgroup comprises a set of SIBs dedicated to a respective group of the SIB category.

16. The method of claim 13, wherein the dual-layer SIB request comprises a request for a first SIB category and a second SIB category.

17. The method of claim 16, wherein the first SIB category comprises a service the UE uses more frequently than the second SIB category.

18. The method of claim 13, wherein the one or more groups comprise at least one of: enhanced mobile broadband (eMBB), mission critical, massive Machine Type Communications (mMTC) services, or Internet of Everything (IoE) services.

19. The method of claim 13, wherein the dual-layer SIB request comprises a format flag which indicates the request is for one SIB category.

20. The method of claim 19, wherein the dual-layer SIB request further comprises a one-bit category field which indicates the SIB category.

21. The method of claim 20, wherein the dual-layer SIB request further comprises a bitmap which indicates the one or more groups within the SIB category.

22. The method of claim 13, wherein the dual-layer SIB request comprises a format flag which indicates the request is for more than one SIB category.

23. The method of claim 22, wherein one portion of the SIB request indicates the one or more groups within a first SIB category and another portion of the SIB request indicates the one or more groups within a second SIB category.

24. The method of claim 13, wherein the SIB category for a first type of UE is different than the SIB category for a second type of UE.

25. An apparatus for wireless communication by a user equipment (UE), comprising:
means for generating a scalable dual-layer system information block (SIB) request, wherein a first layer indicates a SIB category including a subset of SIBs and a second layer indicates one or more groups within the SIB category; and
means for transmitting the dual-layer SIB request to an access network.

26. The apparatus of claim 25,
wherein the one or more groups in a SIB category comprise a first subgroup,
wherein the first subgroup comprises a set of SIBs common to all groups within the SIB category.

27. The apparatus of claim 26,
wherein the one or more groups further comprise a second subgroup,
wherein the second subgroup comprises a set of SIBs dedicated to a respective group of the SIB category.

28. An apparatus for wireless communication by a base station, comprising:
means for receiving, from a user equipment (UE), a scalable dual-layer system information block (SIB) request, wherein a first layer indicates a SIB category including a subset of SIBs and a second layer indicates one or more groups within the SIB category; and
in response to the request, means for transmitting, to the UE, one or more requested SIBs.

29. The apparatus of claim 28, wherein the dual-layer SIB request comprises a request for a first SIB category and a second SIB category.

30. The apparatus of claim 28, wherein the dual-layer SIB request comprises a format flag which indicates the request is for more than one SIB category.

* * * * *